(12) United States Patent
Takemoto (10) Patent No.: US 8,243,339 B2
(45) Date of Patent: Aug. 14, 2012

(54) MULTIFUNCTION APPARATUS THAT CAN BE CONFIGURED TO A PLURALITY OF DIMENSIONS

(75) Inventor: Takatoshi Takemoto, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1081 days.

(21) Appl. No.: 11/513,726

(22) Filed: Aug. 31, 2006

(65) Prior Publication Data

US 2007/0047010 A1    Mar. 1, 2007

(30) Foreign Application Priority Data

Aug. 31, 2005   (JP) ................................. 2005-251778

(51) Int. Cl.
*H04N 1/00* (2006.01)
*H04N 1/04* (2006.01)
(52) U.S. Cl. .................. 358/401; 358/474; 358/497
(58) Field of Classification Search .................. 358/474, 358/497, 401, 74
See application file for complete search history.

(56) References Cited

U.S. PATENT DOCUMENTS

| | | | | |
|---|---|---|---|---|
| 5,126,540 A | * | 6/1992 | Kashiwagi et al. | 235/375 |
| 6,462,839 B1 | * | 10/2002 | Short | 358/474 |
| 6,874,775 B2 | | 4/2005 | Takei | |
| 7,065,208 B2 | * | 6/2006 | Tsubai et al. | 379/428.03 |
| 7,460,281 B2 | * | 12/2008 | Hsu | 358/474 |
| 2002/0176121 A1 | | 11/2002 | Takei et al. | |
| 2003/0094562 A1 | | 5/2003 | Takei | |
| 2005/0157356 A1 | * | 7/2005 | Horaguchi | 358/494 |

FOREIGN PATENT DOCUMENTS

| | | |
|---|---|---|
| JP | 2001-036680 | 2/2001 |
| JP | 2002-35194 | 12/2002 |
| JP | 2003115962 | 4/2003 |
| JP | 2003-134285 | 5/2003 |
| JP | 2003270738 | * 9/2003 |
| JP | 2005-354439 | 12/2005 |
| JP | 9037031 | 2/2007 |

OTHER PUBLICATIONS

Machine translation of JP 2005-091389 to Goino et al.*

* cited by examiner

*Primary Examiner* — Benny Q Tieu
*Assistant Examiner* — Eric A Rust
(74) *Attorney, Agent, or Firm* — Frommer Lawrence & Haug LLP (57) ABSTRACT

A multifunction apparatus includes an image recording unit that records an image on a recording medium; and an image reading unit that can read an image from an original placed on an original placement surface. The image reading unit is configured to move into a plurality of positions in relation to the image recording unit, and to read an image from the original placed on the original placement surface in the plurality of positions.

16 Claims, 9 Drawing Sheets

MULTIFUNCTION APPARATUS THAT CAN BE CONFIGURED TO A PLURALITY OF DIMENSIONS

CROSS-REFERENCE TO RELATED APPLICATION

This application claims the benefit of Japanese Patent Application No. 2005-251778 filed Aug. 31, 2005 in the Japan Patent Office, the disclosure of which is incorporated herein by reference.

BACKGROUND

This invention relates to a multifunction apparatus including an image recording unit and an image reading unit.

Conventionally, a multifunction apparatus including an image recording unit and an image reading unit is known. In this apparatus, the image reading unit comprises an original placement surface (contact glass) for placing an original, such as an original copy, an original text, source book. The original placement surface is disposed approximately horizontally. This is because an original can be more easily placed on the original placement surface, if the original placement surface is disposed approximately horizontally and an image is read from an original, which is relatively thick and heavy, such as a book.

On the other hand, among such multifunction apparatus, those having an original placement surface of an image reading unit disposed in an inclined manner, have also been suggested. If the original placement surface is disposed in the inclined manner, a dimension in the horizontal direction required for installing a multifunction apparatus can be reduced. Therefore, effective use for the installation space can be attempted.

However, all the above described multifunction apparatus have either the original placement surface disposed approximately horizontally, or the original placement surface disposed in an inclined manner.

Therefore, two problems are caused. Firstly, if the original placement surface is disposed approximately horizontally in order to prioritize easy placement of an original, which is relatively thick and heavy, a large space is taken for installing a multifunction apparatus. Secondly, if the original placement surface is disposed in an inclined manner in order to give priority to make the dimension smaller for installing a multifunction apparatus, it becomes less easy to place an original, which is relatively thick and heavy. These two problems could not be solved together.

In consideration of the above and other problems, a multifunction apparatus is preferably capable of making the dimension, required for installing the multifunction apparatus, small in size, and making placement of an original, which is relatively thick and heavy, easy for user's convenience.

SUMMARY

In one aspect of the present invention, a multifunction apparatus includes an image recording unit that records an image on a recording medium and an image reading unit that can read an image from an original placed on an original placement surface. The image reading unit is configured to move into a plurality of positions in relation to the image recording unit, and to read an image from the original placed on the original placement surface in the plurality of positions.

According to the multifunction apparatus configured as above, when the position of the image reading unit is changed in relation to the image recording unit, the image reading unit can read out an image from an original placed on the original placement surface in each of changed positions. Therefore, a user can arbitrarily change the position of the image reading unit in a position convenient for the user. For example, when a user wishes to place an original, which is relatively thick and heavy, the user may displace the image reading unit such that the original placement surface is positioned approximately horizontally. When the user wishes to make a dimension necessary for installing the multifunction apparatus small in size, the user may displace the image reading unit such that the original placement surface is positioned inclined in relation to the horizontal direction.

BRIEF DESCRIPTION OF THE DRAWINGS

The invention will now be described below, by way of an example, with reference to the accompanying drawings, in which.

DETAILED DESCRIPTION OF THE PREFERRED EMBODIMENT

First Embodiment

A multifunction apparatus, exemplified in the first embodiment according to the present invention, includes a scanner function, a printer function, and a reproduction (copier) function.

Figure 1:
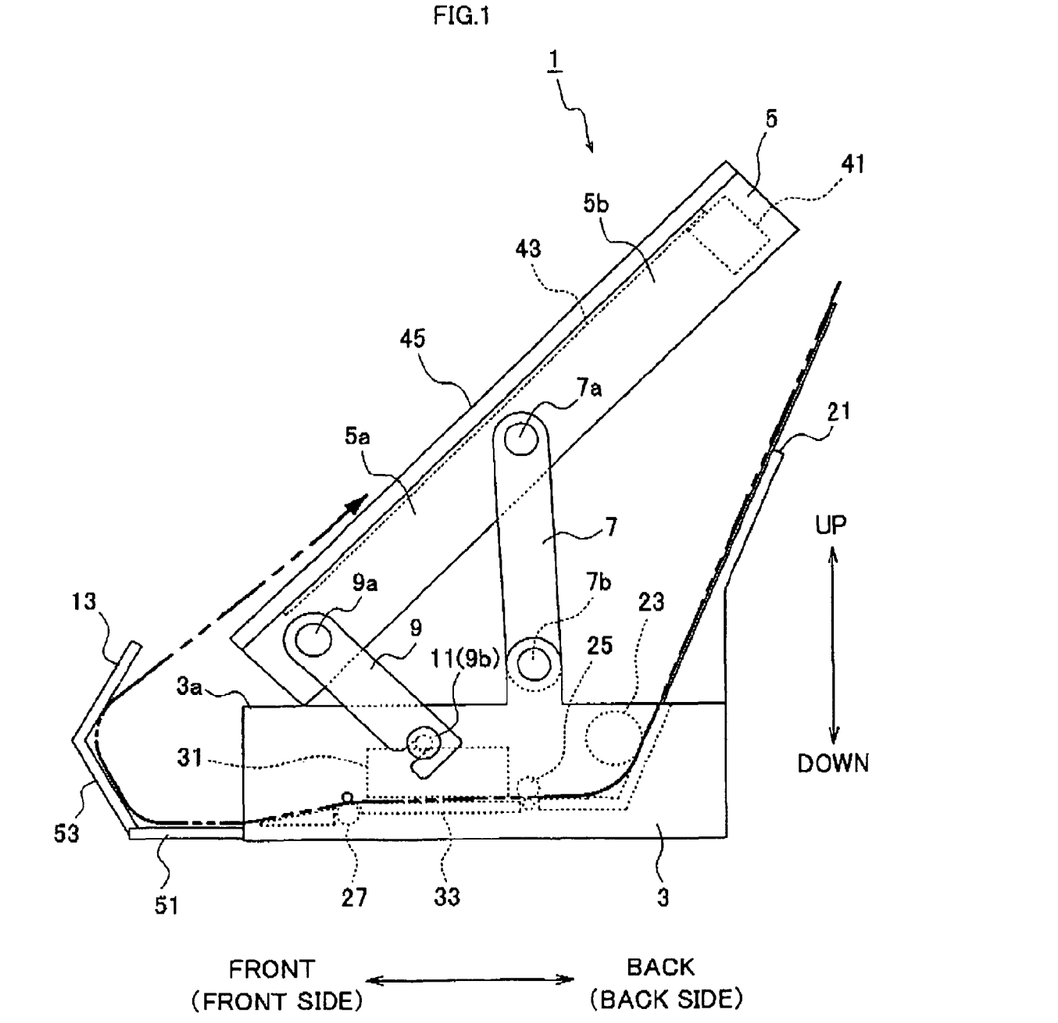
FIG. 1 is a lateral elevation showing the right side of an image reading unit displaced into a first position in a multifunction apparatus according to a first embodiment of the present invention.
Figure 2:
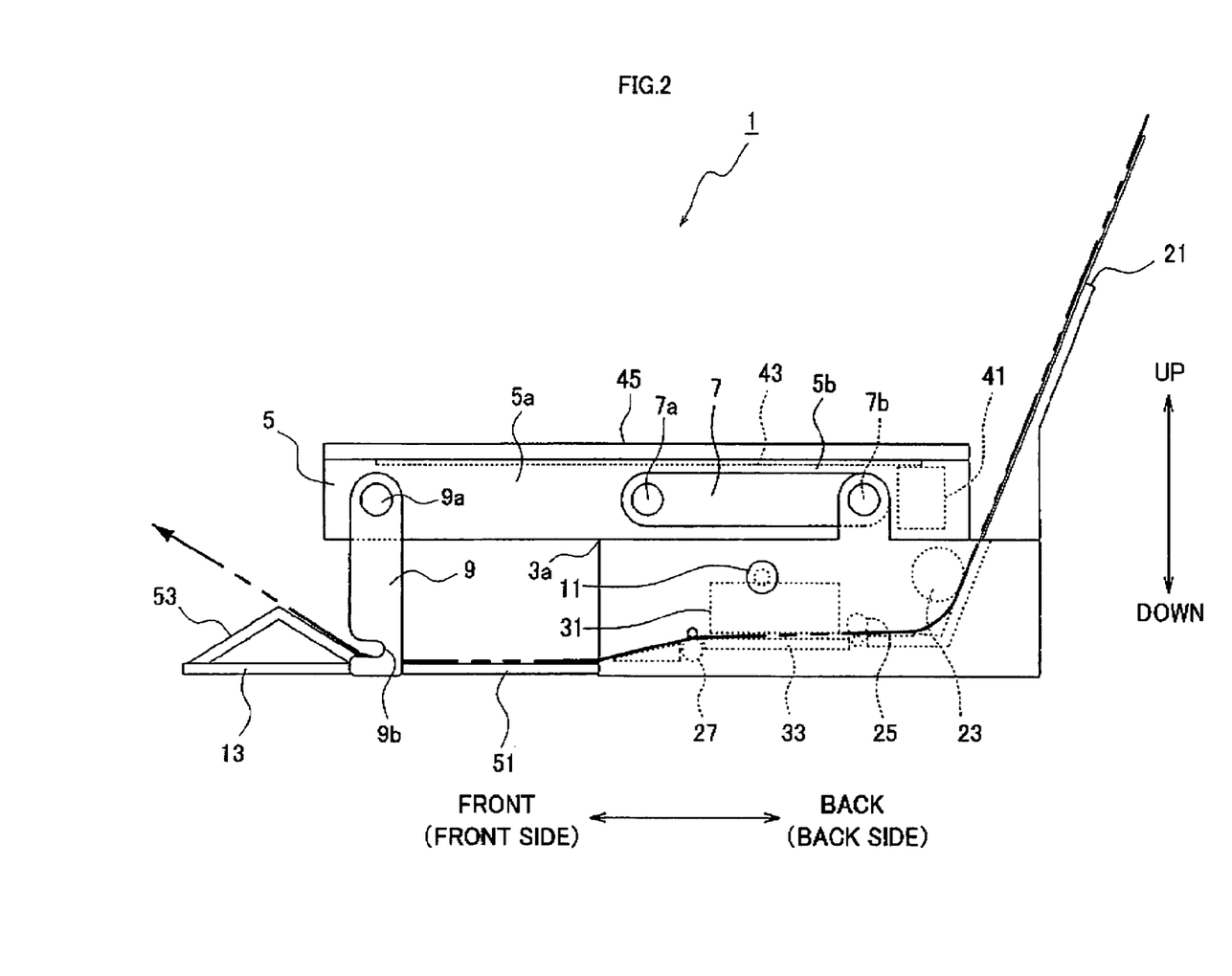
FIG. 2 is a lateral elevation showing the right side of the image reading unit displaced into a second position in the multifunction apparatus according to the first embodiment.

As shown in FIGS. 1 and 2, the multifunction apparatus 1 includes an image recording unit 3, an image reading unit 5, a first connection member 7, a second connection member 9, an engagement portion 11 and a guide member 13. The image recording unit 3 and the image reading unit 5 are connected via the first connection member 7 and the second connection member 9. The position of the image reading unit 5 in relation to the image recording unit 3 can be changed into a first position shown in FIG. 1 and into a second position shown in FIG. 2. The guide portion 13 is configured such that the shape thereof can be changed into a first shape shown in FIG. 1 and into a second shape shown in FIG. 2.

The following describes these structures more in detail.

The image recording unit 3 is provided with a paper feed tray 21, a paper feed roller 23, a conveyance roller 25, a paper discharge roller 27, a recording head 31, a platen 33, and so on.

The paper feed tray 21 is a member wherein sheet-like recording media (for example, recording paper), used for image recording, are stacked on the top surface.

The paper feed roller 23, the conveyance roller 25, and the paper discharge roller 27 are members constituting a conveyance mechanism for a recording medium. Driving force is transmitted to each of the paper feed roller 23, the conveyance roller 25, and the paper discharge roller 27 from at least one motor (not shown) via a gear mechanism (not shown). These rollers are configured so as to be driven and rotated by the transmitted driving force. Recording media, stacked on the paper feed tray 21, are fed in a sheet-by-sheet manner from the paper feed tray 21 toward the downstream side of a conveyance path corresponding to the rotation of the paper food roller 23. The recording medium, fed by the paper feed roller 23, is furthermore conveyed by the conveyance roller 25 toward the downstream side of the conveyance path. The recording medium, which is conveyed by the conveyance roller 25 and passes above the platen 33, is still furthermore conveyed by the discharge roller 27 toward the downstream side of the conveyance path, and discharged from the image recording unit 3.

In the present embodiment, an inkjet recording head is adopted for the recording head 31. To the recording head 31, driving force is transmitted from a motor (not shown) via a timing belt (not shown). Due to the transmitted driving force, the recording head 31 is reciprocated in the left-to-right direction (in a main scanning direction; in a direction perpendicular to the surface of the paper for FIG. 1 or FIG. 2). Moreover, on the bottom surface of the recording head 31, a plurality of nozzles are provided so as to eject ink from the nozzles toward a recording medium placed under the recording head 31, and to record an image on the surface of the recording medium. On the recording medium, a predetermined number of lines of an image are recorded every time the recording head 31 is reciprocated in the left-to-right direction. Every time the predetermined number of lines of an image is recorded on the recording medium, the recording medium is conveyed forward (in a sub-scanning direction) by the above-described conveyance mechanism by predetermined distances. By repetition of the reciprocation of the recording head 31 and the conveyance by the conveyance mechanism, the entire image is recorded on the recording medium.

The platen 33 is a member disposed in a position where the platen 33 faces the bottom surface of the recording head 31 across a recording medium. The platen 33 fulfills a role to support a recording medium from underneath when image recording is performed by the recording head 31.

Furthermore, the image reading unit 5 is provided with an image sensor 41, a contact glass 43, a cover 45, and so on.

The image sensor 41 is a color line sensor which can optically read the predetermined number of lines of an image extending in the left-to-right direction (in the main scanning direction). This image sensor 41 is configured so as to be driven by a motor (not shown), and reciprocated in a back-and-forth direction in FIG. 2. Every time the image sensor 41 reads the predetermined number of lines of an image from an original placed on the contact glass 43, the image sensor 41 is moved forward (in the sub-scanning direction) for the predetermined number of lines. By repetition of the image reading for the predetermined number of lines of an image and the forward movement, the image sensor 41 reads the entire image.

The contact glass 43 is a member made of a transparent and colorless glass. The top surface of the contact glass 45 is the original placement surface for placing an original, which is a reading target to be read by the image reading unit 5.

The cover 45 is a member which covers the top surface of the contact glass 43 and can be opened and closed. When the cover 45 is opened, an original can be placed on the contact glass 43. When the cover 45 is closed, the original placed on the contact glass 43 is sandwiched between the cover 45 and the contact glass 43.

A first end 7a of the first connection member 7 is rotatably connected to the image reading unit 5. A second end 7b of the first connection member 7 is connected to the image recording unit 3. A first end 9a of the second connection member 9 is rotatably connected to the image reading unit 5. A second end 9b of the second connection member 9 is configured such that this end 9b can be engaged/disengaged with/from the engagement portion 11.

Positioning of the image reading unit 5 into the first position is performed as follows. That is, as shown in FIG. 1, the position of the image reading unit 5 is displaced into the first position by rotating the first connection member 7 and the second connection member 9. Next, the image reading unit 5 is secured and supported in the first position by engaging the second end 9b of the second connection member 9 with the engagement portion 11. In this case, the second connection member 9 functions as a fixing member.

Positioning of the image reading unit 5 into the second position is performed as follows. That is, as shown in FIG. 2, the position of the image reading unit 5 is displaced into the second position. The second end 9b of the second connection member 9 is disengaged from the engagement portion 11, being abutted upon a surface (installation surface) on which the multifunction apparatus 1 is installed. Therefore, the image reading unit 5 can be supported from a bottom side thereof by the second connection member 9. The second connection member 9 functions as a supporting leg.

Figure 4:
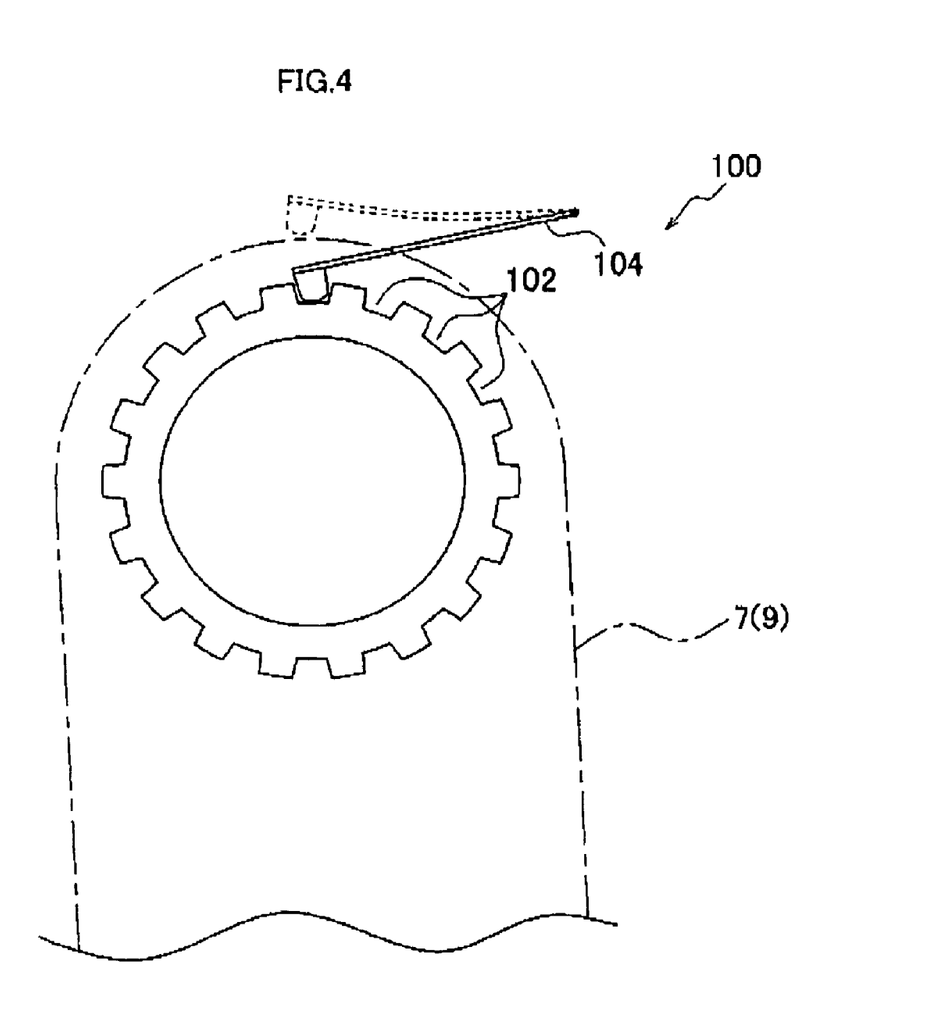
FIG. 4 is a lateral elevation showing a general structure of a rotation restricting mechanism in the multifunction apparatus according to the first embodiment.

In the present embodiment, in each of the connecting portions on the first and second ends 7a and 7b of the first connection member 7 and on the first end 9a of the second connection member 9, a rotation restricting mechanism 100 is incorporated. The rotation restricting mechanism 100 is constituted with a plurality of notches 102 and a locking portion 104 which engages with one of the notches 102 (see FIG. 4). This rotation restricting mechanism 100 is configured such that the locking portion 104 does not get unlocked from one of the notches 102 only by the weight of the image reading unit 5 being applied thereon, and such that the locking portion 104 gets unlocked from one of the notches 102 when a force equal to or larger than a predetermined value is applied. Due to this configuration, only when a user intentionally applies the force equal to or larger than the predetermined value, the connecting portions can be rotated by defined angles. Each of the defined angles corresponds to the distance from one notch to another.

The guide portion 13 is a member which guides a recording medium. A recording medium is discharged toward the front side of the image recording unit 3 along a guide surface of the guide portion 13. This guide portion 13 is provided with a slide portion 51 and a rotation portion 53.

The slide portion 51 can be slid in the back-and-forth direction in the front side of the image recording unit 3. The top surface of the slide portion 51 is the guide surface which is in parallel (approximately horizontal) to the installation surface. A recording medium, discharged toward the front side of the image recording unit 3, is guided forward while maintaining a state wherein the recording medium is parallel to the installation surface.

The rotation portion 53 can be rotated in relation to the slide portion 51. In the side view, the rotation portion 53 is curved approximately in a dogleg manner. One of the front side and back side of the rotation portion 53 is used as the guide surface.

The shape of the guide portion 13, configured as above, can be changed into a first shape shown in FIG. 1 by sliding the slide portion 51 backward and rotating the rotation portion 53 in a direction wherein the free end of the rotation portion 53 is moved away from the slide portion 51. When the shape of the guide portion 13 is changed into the first shape, the guide portion 13 becomes capable of guiding a recording medium along the guide surface toward the top surface of the image reading unit 5 (see the conveyance path shown with an arrow with a chain double-dashed line in FIG. 1).

On the other hand, the shape of the guide portion 13 is changed into a second shape shown in FIG. 2 by sliding the slide portion 51 forward and rotating the rotation portion 53 in a direction wherein the free end of the rotation portion 53 is abutted on the slide portion 51. When the shape of the guide portion 13 is changed into the second shape, the guide portion 13 becomes capable of guiding a recording medium along the guide surface under the image reading unit 6 (see the conveyance path shown with an arrow with a chain double-dashed line in FIG. 2). It is to be noted that the free end of the rotation portion 53 fits into a groove (not shown) formed on the slide portion 51 in the second shape. The end surface of the free end of the rotation portion 53 is hidden in the groove. Therefore, a recording medium, discharged forward on the slide portion 51, is smoothly discharged onto the inclined surface formed by the rotation portion 53, without any interruption in the conveyance of the recording medium caused by hitting an end of the recording medium against the end surface of the rotation portion 53.

In the multifunction apparatus configured as above, even when the position of the image reading unit 5 is changed in relation to the image recording unit 3, the image reading unit 5 can read an image from an original, placed on the contact glass 43 (the original placement surface), in each of the changed positions of the image reading unit 5. Therefore, a user can arbitrarily change the position of the image reading unit 5 to a position convenient for the user.

More specifically, when, for example, a user wishes to reduce the dimension necessary for installing the multifunction apparatus 1, the user can displace the image reading unit 5 into the first position shown in FIG. 1. When the image reading unit 5 is displaced into the first position shown in FIG. 1, a portion 5a (a first portion) of the image reading unit 5 is moved from a position, in which the portion 5a is not within an area above the image recording unit 3, to a position, in which the portion 5a substantially fits into the area above the image recording unit 3. That is, the proportion of the portion of the image reading unit 5 that is within the area above the image recording unit 3 is increased in relation to the proportion of the portion of the image reading unit 5 that is not substantially within the area above the image recording unit 3. Therefore, the dimension in the horizontal direction required for installing the multifunction apparatus 1 can be reduced.

In addition, the portion 5a of the image reading unit 5 described above is moved in the horizontal direction, from a position, in which the portion 5a is positioned in advance of a front peripheral portion 3a of the image recording unit 3, to a position, in which the portion 5a is positioned behind the front peripheral portion 3a of the image recording unit 3. Therefore, an extra space can be newly made in the front side of the multifunction apparatus 1. As a result, with this multifunction apparatus 1, an extra space can be made so that a user can conveniently use the extra space, rather than the case where an extra space is made in a remote place, such as in the back side or the lateral side of the multifunction apparatus 1.

Furthermore, when the image reading unit 5 is displaced into the first position as shown in FIG. 1, the second connection member 9 can be engaged with the engagement portion 11 and function as a fixing member. Therefore, even if some load is applied to the image reading unit 5 in the first position, the image reading unit 5 can be secured so as not to be displaced from the first position.

Figure 3:
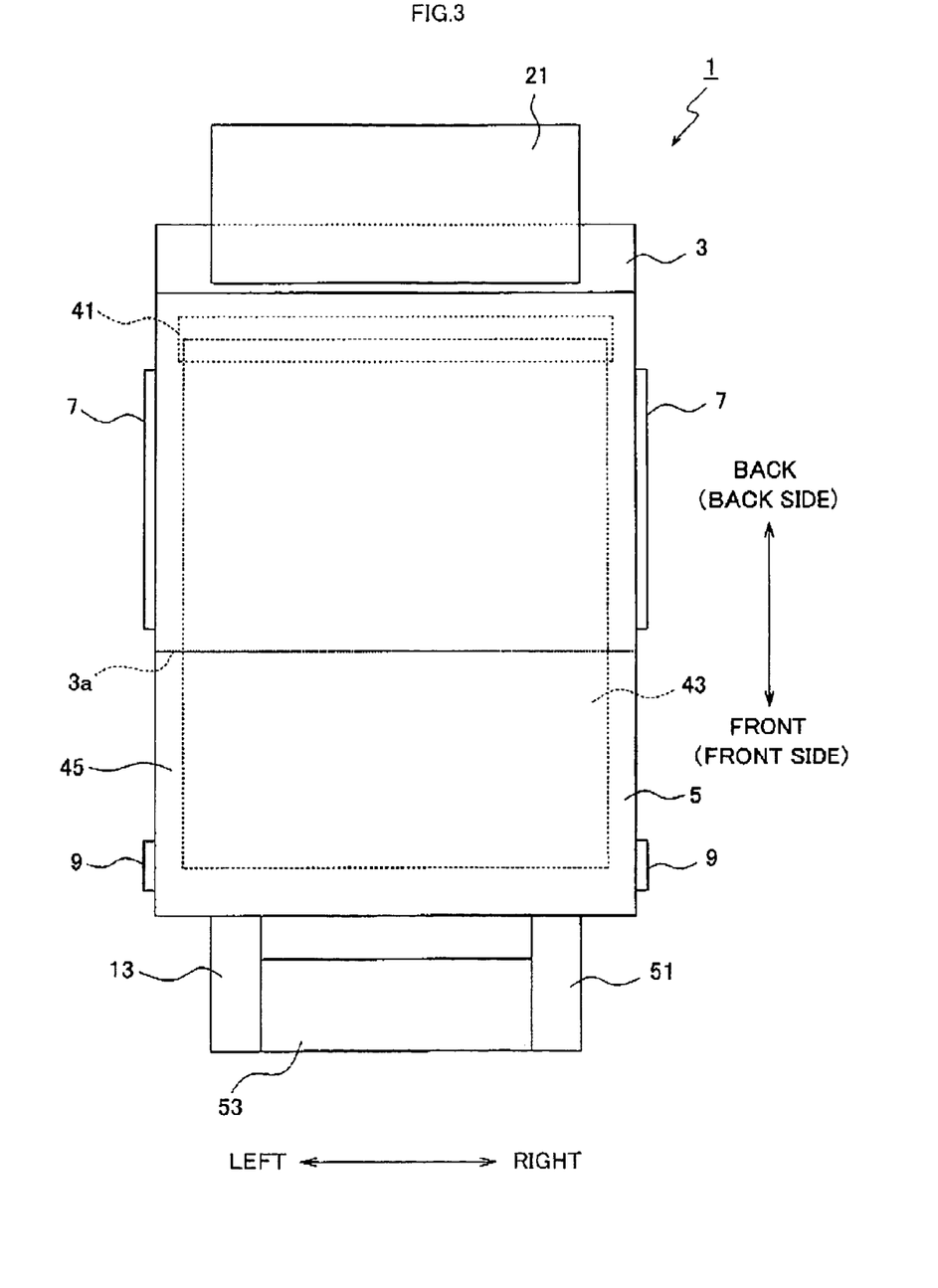
FIG. 3 is a plan view showing the image reading unit displaced into the second position in the multifunction apparatus according to the first embodiment.

On the other hand, when a user wishes to place an original, which is relatively thick and heavy, the user can displace the image reading unit 5 into the second position as shown in FIGS. 2 and 3. In this way, the image reading unit 5 is positioned so that the original placement surface can be approximately a horizontal surface, and an original, which is relatively thick and heavy, such as a book, can be stably positioned onto the original placement surface so that the original does not slip off from the original placement surface. In the second position, the second connection member 9 cannot be engaged with the engagement portion 11. However, the second end 9b of the second connection member 9 can be abutted on the installation surface for the multifunction apparatus 1, and the connection member 9 can serve as a supporting leg. Furthermore, one portion 5b (a second portion) of the image reading unit 5 is mounted on the top surface of the image recording unit 3. Therefore, the image reading unit 5 is supported by both of the second connection member 9 and the image recording unit 3. Even if a heavy original is placed on the contact glass 43, the image reading unit 5 can be supported in a stable manner.

Furthermore, according to the multifunction apparatus 1, the second connection member 9 functions as a fixing member and also as a supporting leg. Therefore, in comparison with the case where a fixing member and a supporting leg are provided separately (so as to make each of which work as the second connection member 9), the number of parts can be reduced to constitute the multifunction apparatus 1. As a result, simplification of the manufacturing process and reduction in the manufacturing cost thereof can be achieved.

In addition, according to the multifunction apparatus 1, when the shape of the guide portion 13 is changed into the first shape, a recording medium, discharged from the image recording unit 3, is guided by the guide unit 13 toward the top surface of the image reading unit 5. Therefore, in comparison with the case where a recording medium is discharged horizontally toward the front side of the image recording unit 3, the space necessary for discharging a recording medium can be reduced. As a result, when an extra space is made in the front side of the multifunction apparatus 1 especially by displacing the image reading unit 5 into the first position, usage of the extra space made by the displacing only for paper discharge can be inhibited. Therefore, the extra space can be used more effectively. Furthermore, when the shape of the guide portion 13 is changed into the second shape, the guide portion 13 becomes capable of guiding a recording medium along the guide surface under the image reading unit 5. Therefore, when the image reading unit 5 is disposed in the front side of and above the image recording unit 3, the guide portion 13 can guide a recording medium so that the recording medium is not guided toward the top surface of the image reading unit 5.

Moreover, according to the multifunction apparatus 1, when the image reading unit 5 is displaced into the second position as shown in FIGS. 2 and 3, the image reading unit 5 can be effectively disposed above at least a part of the paper feed tray 21. Therefore, the image reading unit 5 can also serve as a roof so as to prevent dust from falling onto the paper feed tray 21. As a result, the image reading unit 5 in this position can inhibit dust from falling on recording media stacked on the paper feed tray 21.

Second Embodiment

The following describes a second embodiment of the present invention. A multifunction apparatus, exemplified as the second embodiment, differs from the multifunction apparatus 1 according to the first embodiment in the shapes and the operational directions of respective components. However, the multifunction apparatus according to the present embodiment is provided with components which work equivalently to those in the first embodiment. Therefore, in the following description, the same reference numbers, used in the first embodiment, are given to those members which have functions equivalent to the ones in the first embodiment.

A multifunction apparatus 61 to be described hereinafter is also an apparatus including a scanner function, a printer function, and a reproduction (copier) function in the same manner as in the multifunction apparatus 1 according to the first embodiment.

Figure 5:
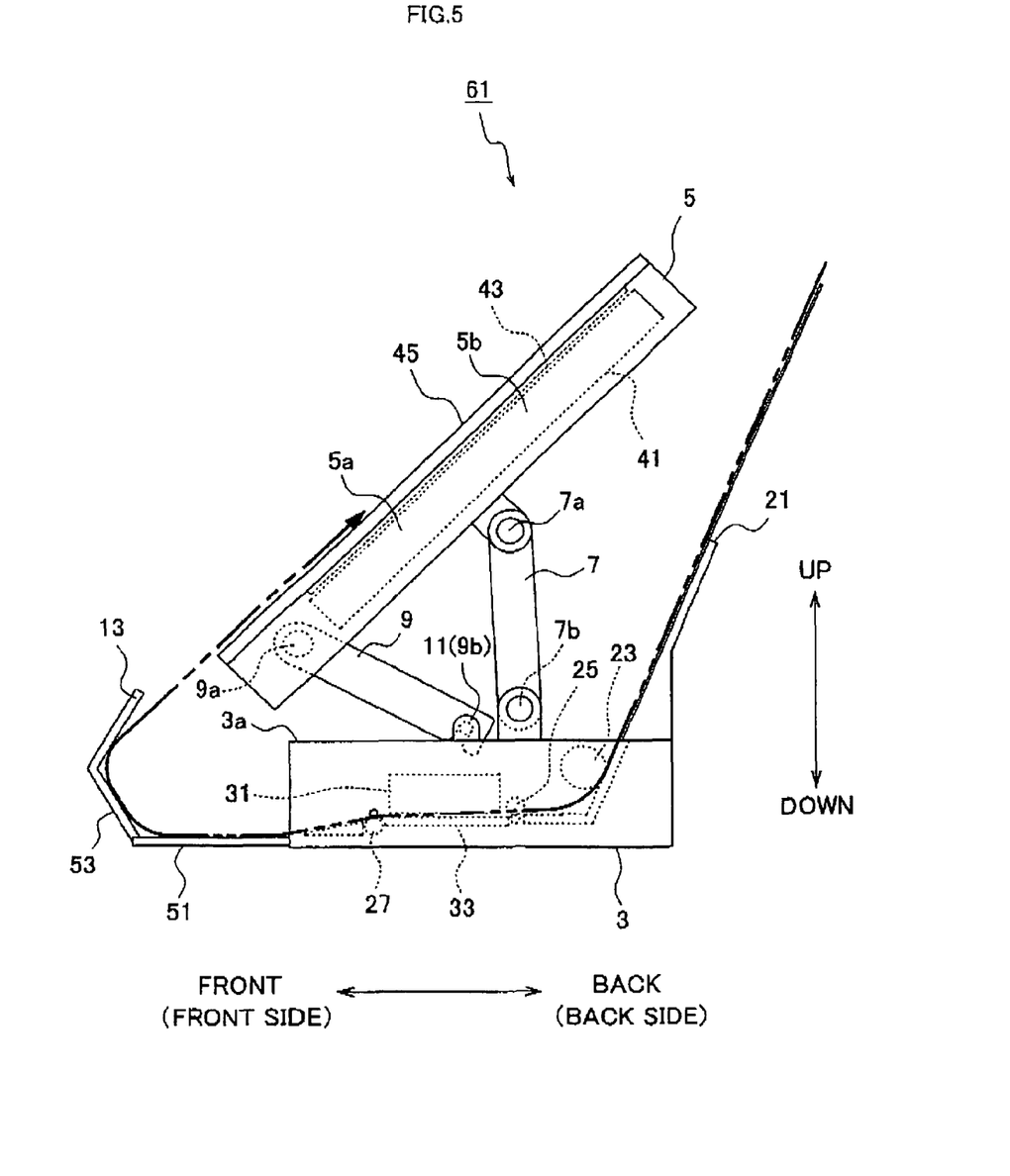
FIG. 5 is a lateral elevation showing the right side of an image reading unit displaced into a first position in a multifunction apparatus according to a second embodiment of the present invention.
Figure 6:
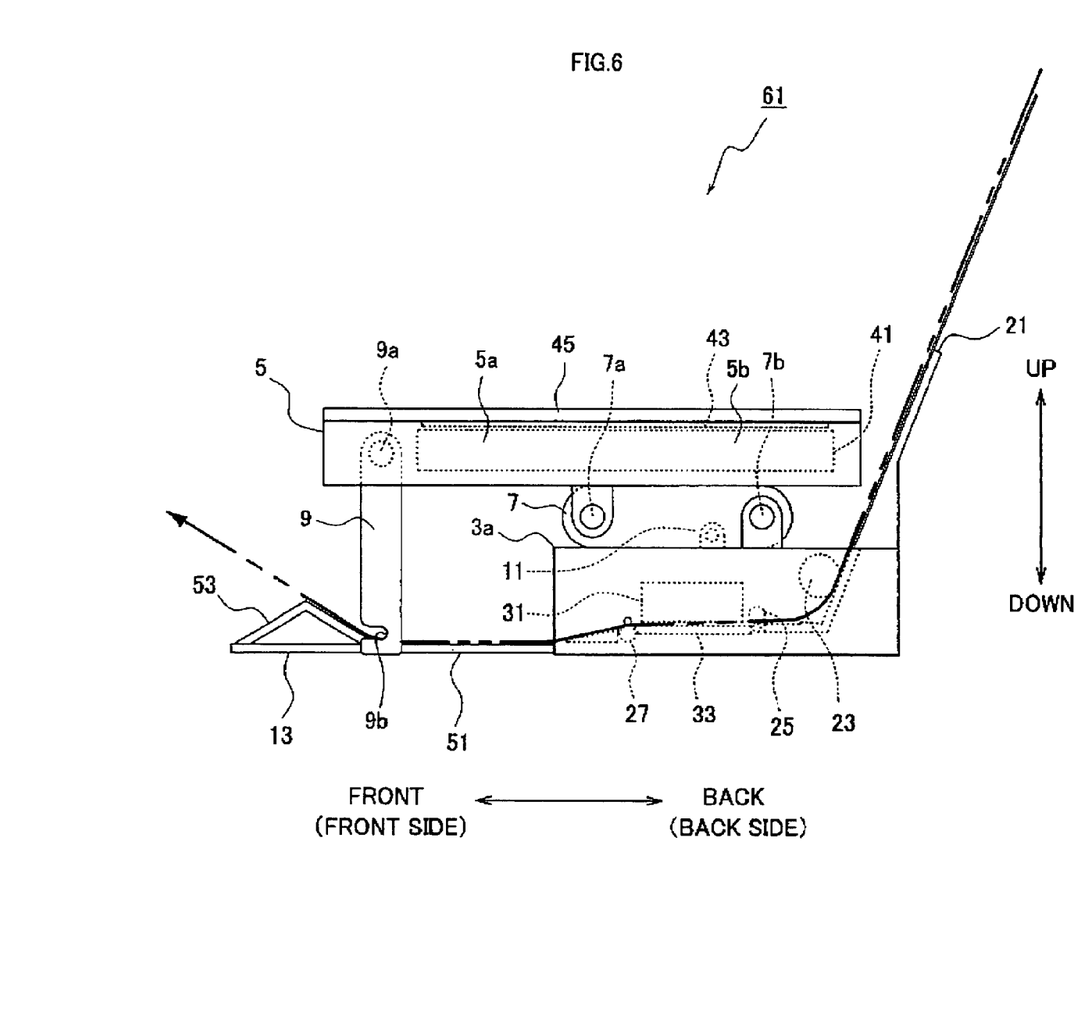
FIG. 6 is a lateral elevation showing the right side of the image reading unit displaced into a second position in the multifunction apparatus according to the second embodiment.

As shown in FIGS. 5 and 6, the multifunction apparatus 61 includes an image recording unit 3, an image reading unit 5, a first connection member 7, a second connection member 9, an engagement portion 11, and a guide portion 13. The image recording unit 3 and the image reading unit 5 are connected via the first and the second connection members 7 and 9. Therefore, the position of the image reading unit 5 in relation to the image recording unit 3 can be changed into a first position shown in FIG. 5 or into a second position shown in FIG. 6. Moreover, the guide portion 13 is configured such that the shape can be changed into a first shape shown in FIG. 5 or into a second shape shown in FIG. 6.

In this configuration, the image recording unit 3 and the guide portion 13 barely have a difference from those in the first embodiment. Therefore, the description of these components is not repeated here.

The image reading unit 5, the first connection member 7, the second connection member 9, and the engagement portion 11 barely have a functional difference. However, the shapes, the operation directions, and the like of these components are different, to some extent, from those in the first embodiment.

Figure 7:
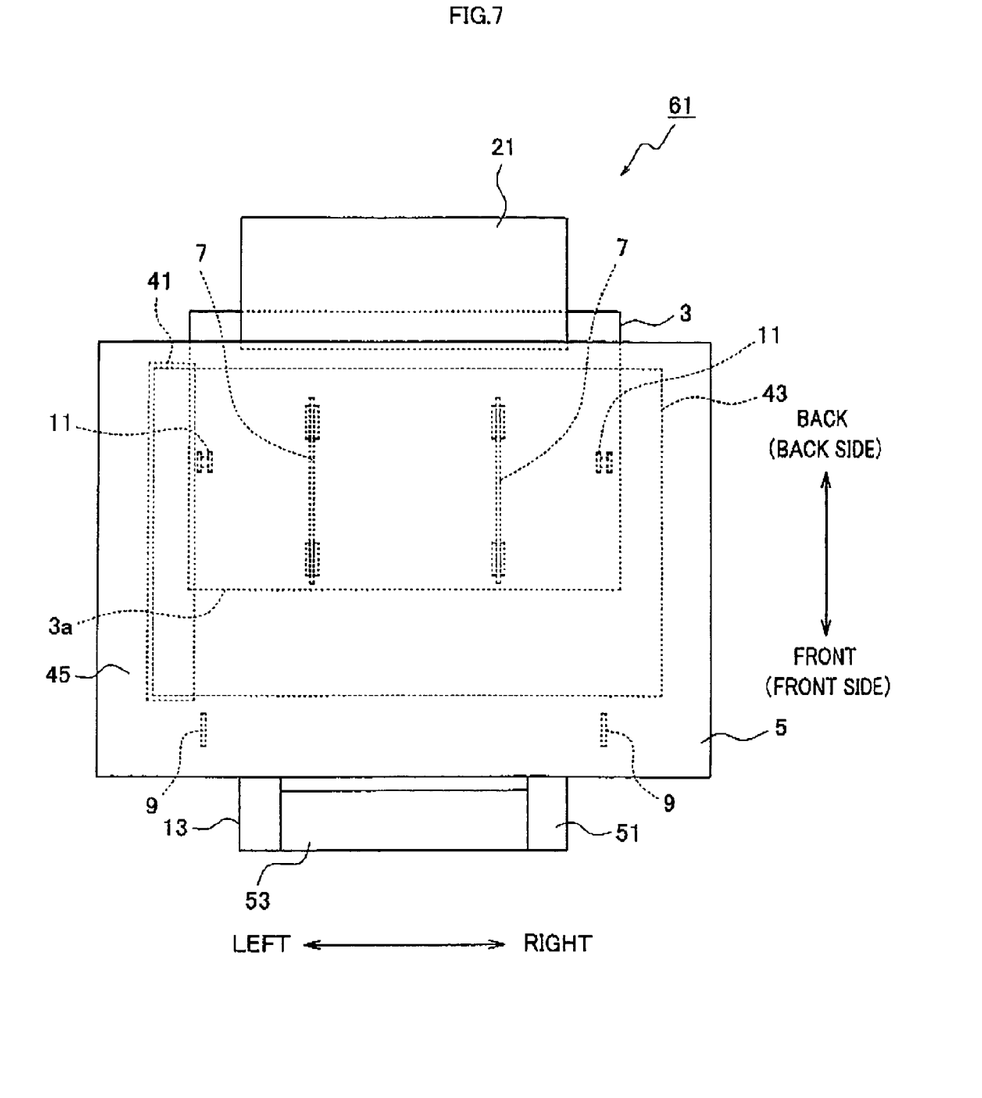
FIG. 7 is a plan view showing the image reading unit displaced into the second position in the multifunction apparatus according to the second embodiment.

Specifically, in the first embodiment, the image reading unit 5, which is long in the back-and-forth direction, is adopted. However, in the second embodiment, the image reading unit 5, which is long in the left-to-right direction, is adopted. Moreover, an image sensor 41 of the image reading unit 5 is configured such that the image sensor 41 can be reciprocated in the left-to-right direction in FIG. 7. The image sensor 41 is also configured so as to optically read an image from an original on a contact glass 43 above the image sensor 41 while moving rightward (in a sub scanning direction).

Furthermore, in the first embodiment, the first and the second connection members 7 and 9 are disposed on the lateral side of the image reading unit 5. However, in the second embodiment, the first and the second connection members 7 and 9 are disposed on the bottom surface of the image reading unit 5, and the position of the engagement portion 11 is also changed correspondingly.

In the multifunction apparatus 61 configured as above, even when the position of the image reading unit 5 is changed in relation to the image recording unit 3, the image reading unit 6 can read an image from an original placed on the contact glass 43 (the original placement surface) in each of the changed positions of the image reading unit 5, in the same manner as in the multifunction apparatus 1 in the first embodiment.

Therefore, a user can arbitrarily change the position of the image reading unit 5 into a position where the user can conveniently use the multifunction apparatus 61. When, for example, a user wishes to reduce the dimension necessary for installing the multifunction apparatus 61, the user can displace the image reading unit 5 into the first position shown in FIG. 5. When a user wishes to place an original, which is relatively thick and heavy, the user can displace the image reading unit 5 into the second position shown in FIGS. 6 and 7.

Moreover, according to the multifunction apparatus 61, when the image reading unit 5 is displaced into the first position, an extra space can be made in the front side of the multifunction apparatus 61.

Furthermore, according to the multifunction apparatus 61, when the image reading unit 5 is displaced into the first position, the second connection member 9 functions as a fixing member which secures the image reading unit 5 in the first position, in the same manner as in the multifunction apparatus 1. When the image reading unit 5 is displaced into the second position, the second connection member 9 is abutted on the surface (installation surface) on which the multifunction apparatus 61 is installed, and functions as a supporting leg which supports the image reading unit 6. Since the single second connection member 9 functions as both of the fixing member and the supporting leg, in comparison with the case where a fixing member and a supporting leg are provided separately (so as to make each of which work as the connection member 9), the number of parts can be reduced to constitute the multifunction apparatus 61. As a result, simplification of the manufacturing process and reduction in the manufacturing cost thereof can be achieved.

In addition, according to the multifunction apparatus 61, when the shape of the guide portion 13 is changed into the first shape, a recording medium, discharged from the image recording unit 3, is guided toward the top surface of the image reading unit 5. In comparison with the case where a recording medium is discharged horizontally toward the front side of the image recording unit 3, the space necessary for discharging a recording medium can be reduced. Moreover, when the shape of the guide portion 13 is changed into the second shape, the guide portion 13 becomes capable of guiding a recording medium along the guide surface under the image reading unit 5. Therefore, when the image reading unit 5 is positioned in the front side of and above the image recording unit 3, the guide portion 13 can guide a recording medium so that a recording medium is not guided toward the top side of the image recording unit 5.

It is to be noted that, as compared to the multifunction apparatus 1 according to the first embodiment, in the multifunction apparatus 61 according to the second embodiment, the size of the multifunction apparatus 61 in the height direction can be limited, even when the image reading unit 5 is displaced into the first position, because the image reading unit 5 is long in the left-to-right direction. Therefore, if, for example, the size of the image reading unit 5 is relatively large (for example, as large as to accommodate an original in A3 size), the configuration according to the second embodiment is preferably adopted so as to limit the size of a multifunction apparatus in the height direction. On the other hand, if the size of the image reading unit 5 is relatively small (for example, as small as to accommodate an original in up to A4 size), the configuration according to the first embodiment is preferably adopted so as to limit the size of a multifunction apparatus in the left-to-right direction.

Other Embodiment

The above has described embodiments of the present invention. However, the present invention is not limited to the specific embodiments described above. The present invention can be implemented in various embodiments.

Figure 8:
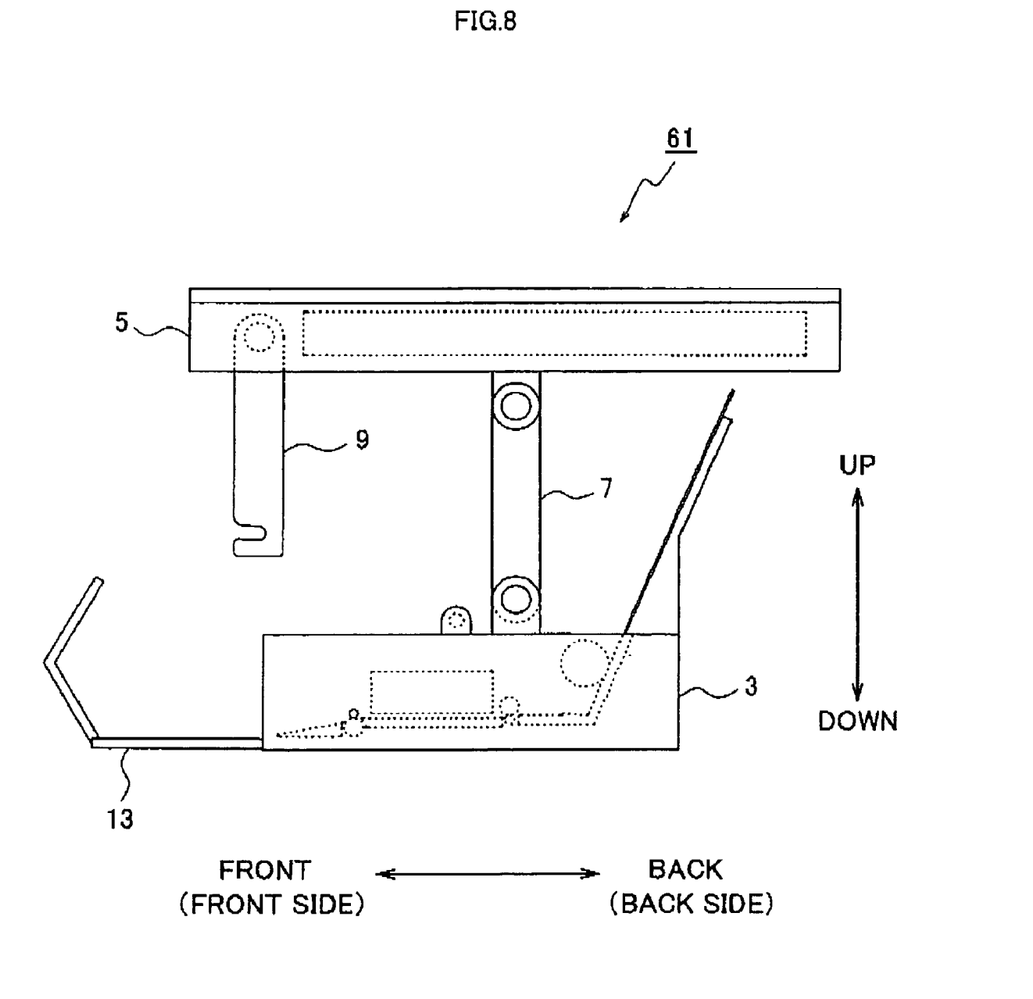
FIG. 8 is a lateral elevation showing the image reading unit displaced in a position other than the first and second positions wherein an original placement surface is in a horizontal state in the multifunction apparatus according to the second embodiment.

For example, in the respective embodiments described above, examples are shown wherein the image reading unit 5 is displaced into the first and the second position. The image reading unit 5 can be also displaced into some other positions. Specifically, as shown in FIG. 8, for example, in the multifunction apparatus 61 according to the second embodiment, when the image reading unit 5 is rotated to a position wherein the original placement surface becomes horizontal while the first connection member 7 is standing vertically, an original, which is thick and heavy, can be placed on to the original placement surface. In this case, however, the second connection member 9 cannot serve as a supporting leg, which is different from when the image reading unit 5 is in the second position. The image reading unit 5 is supported only by the first connection member 7. Therefore, in order to hold the image reading unit 5 in a predetermined position, a structure should be made such that the connecting portions of the first connection member 7 are not easily moved by a load from the side of the image reading unit 5.

Moreover, the above-described embodiments have respectively described that the rotation restricting mechanism 100 is incorporated in each of the connecting portions on the first and the second ends 7a and 7b of the first connection member 7 and on the first end 9a of the second connection member 9. The rotation restricting mechanism 100 is constituted with the notches 102 and the locking portion 104 which engages with one of the notches 102.

Figure 9A:
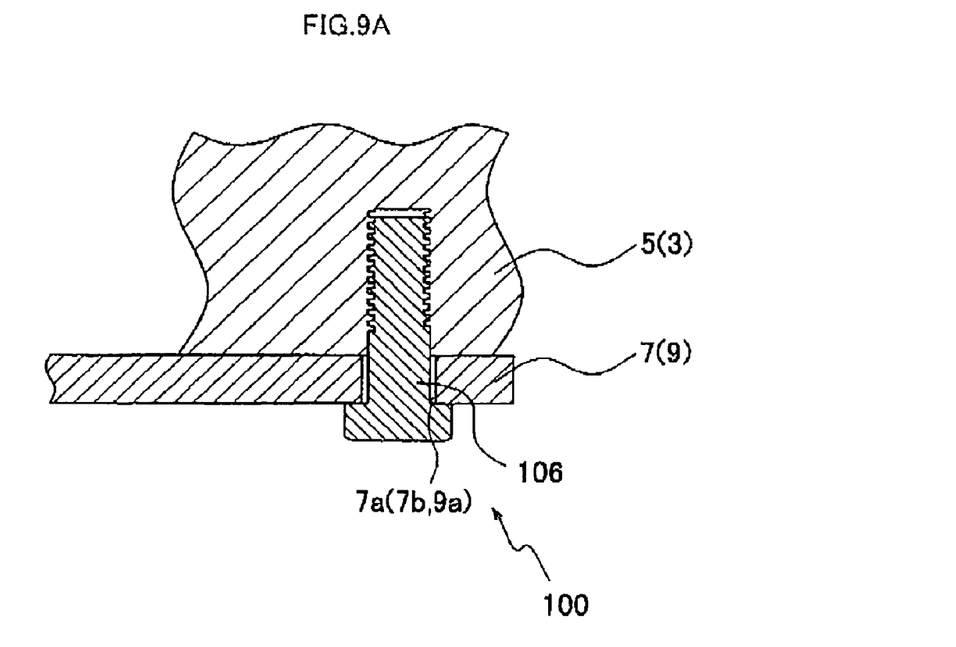
FIGS. 9A and 9B are lateral elevations showing general structures of rotation restricting mechanisms according to other embodiments.
Figure 9B:
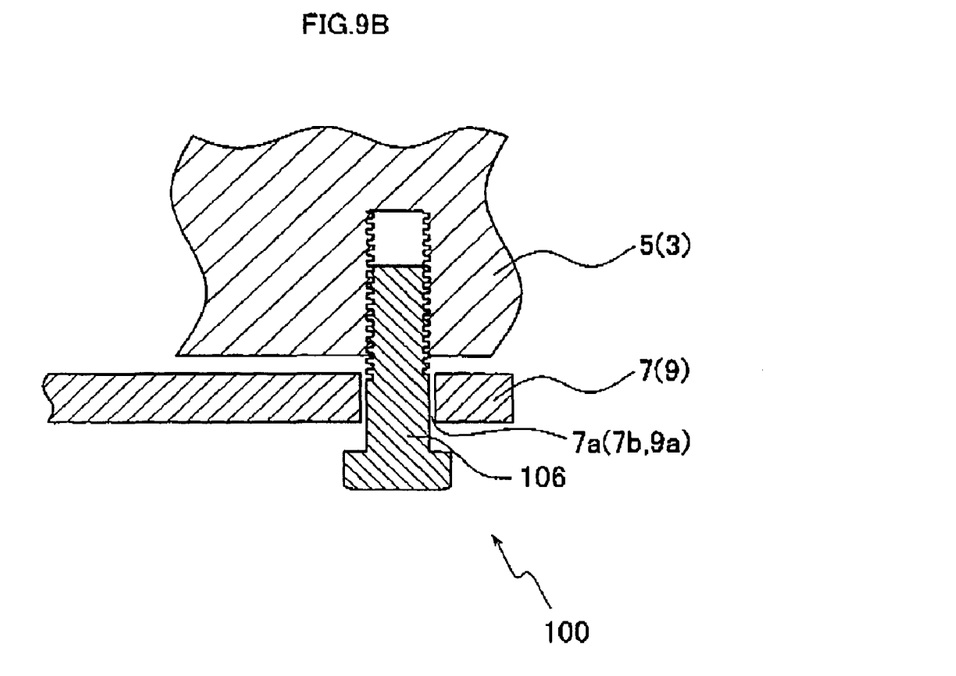

However, the mechanism (the rotation restricting mechanism 100) for keeping the image reading unit 5 in position does not have to be a mechanism using the notches 102. For example, a rotation restriction mechanism 100 can be provided, as shown in FIGS. 9A and 9B. In this rotation restriction mechanism 100, the rotations of respective connecting portions are restricted when screws 106 are fastened as shown in FIG. 9A. The respective connecting portions become rotatable when the screws 106 are loosened as shown in FIG. 9B. Even in this type of mechanism 100, the image reading unit 6 can be displaced up to a predetermined position when the screws 106 are loosened. The image reading unit 5 can be secured in the predetermined position by fastening the screws 106.

Although the above-described embodiments does not mention, the structure for a signal line for transmitting signals between the image recording unit 3 and the image reading unit 5, and a power line for supplying electric power are preferably provided so as to be passed through inside of the first connection member 7. This kind of structure can provide a good outward appearance of a multifunction apparatus. If the outward appearance does not matter, a wire harnesses including these lines can be provided outside of the first connection member 7 between the image recording unit 3 and the image reading unit 5.

The above-described embodiments describe that the second connection member 9 is made so as to serve as a supporting leg. On the bottom end of such supporting leg, a member, which works as anti slipper, such as a rubber material, can be provided.

Although the specific embodiments have been illustrated and described herein, it will be appreciated by those of ordinary skill in the art that any arrangement to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures are used. Accordingly, the scope of the invention should only be determined with reference to the appended claims, along with the full scope of equivalents to which such claims are entitled.

What is claimed is:

1. A multifunction apparatus comprising:
   an image recording unit that records an image on a recording medium; and
   an image reading unit that can read an image from an original placed on an original placement surface, the image reading unit being configured to move into a plurality of positions in relation to the image recording unit, and the image reading unit is configured to read an image from the original placed on the original placement surface in the plurality of positions;
   a first connection member having a first end rotatably connected to the image reading unit, and a second end rotatably connected to the image recording unit; and
   a second connection member having a first end rotatably connected to the image reading unit, and a second end that is detachable with respect to the image recording unit;
   wherein a movement of the image reading unit into a different position requires that the second end of the second connection member to be disengaged from the image recording unit;
   wherein the image reading unit is configured to be secured in the plurality of positions, the plurality of positions including at least a first position and a second position;
   wherein in the first position, the image reading unit is positioned substantially at an angle in relation to the image recording unit;
   wherein in the second position, the image reading unit is positioned substantially parallel with the image recording unit;
   wherein the image reading unit is configured such that one of the ends of the image reading unit is in a predetermined direction that is moveable in a direction departing from the image recording unit and is inclinable in the predetermined direction;
   wherein the multifunction apparatus is configured such that a proportion of a portion of the image reading unit that is substantially within an area above the image recording unit as compared to a portion of the image reading unit that is not substantially within the area above the image recording unit can be changed by changing the position of the image reading unit in relation to the image recording unit;

wherein when the image reading unit is displaced from the second position to the first position, a dimension in the horizontal direction of the entire multifunction apparatus is reduced;

wherein when the image reading unit is displaced from the first position to the second position, a dimension in the vertical direction of the entire multifunction apparatus is reduced, and the displacement changes the angular positioning between the image reading unit and the image recording unit independently of a horizontal positioning between the image reading unit and the image recording unit;

wherein when the image reading unit is in the first position, a first portion of the image reading unit is substantially within an area above the entire image recording unit;

wherein when the image reading unit is in the second position, the first portion of the image reading unit is substantially not within the area above the entire image recording unit; and wherein the image reading unit has an original placement surface which is larger than the area above the entire image recording unit.

2. The multifunction apparatus as set forth in claim 1;
wherein the image reading unit includes a first portion and a second portion, further wherein the first portion is located adjacent to a front surface of the image recording unit and the second portion is located adjacent to a back surface of the image recording unit.

3. The multifunction apparatus as set forth in claim 2;
wherein when the image reading unit is in the first position, the first portion is positioned adjacent to the image recording unit and the second portion is positioned apart from the image recording unit.

4. The multifunction apparatus as set forth in claim 2;
wherein when the image reading unit is in the first position, the second portion is positioned vertically from the image recording unit.

5. The multifunction apparatus as set forth in claim 1;
wherein when the image reading unit is moved from the first position to the second position, the image reading unit is moved in a horizontal and a vertical direction.

6. The multifunction apparatus as set forth in claim 1;
wherein the original placement surface is inclined from the horizontal direction when the image reading unit is in the first position, and wherein the original placement surface is disposed approximately horizontally when the image reading unit is in the second position.

7. The multifunction apparatus as set forth in claim 1 further comprising:
an engagement portion positioned on the image recording unit, wherein the second end of the second connection member is detachable with respect to the engagement portion.

8. The multifunction apparatus as set forth in claim 1;
wherein the second connection member is, operable as a fixing member that secures the image reading unit in the first position.

9. The multifunction apparatus as set forth in claim 1;
wherein the second connection member is operable as a supporting leg that supports the image reading unit in the second position, and the second connection member is abutted on an installation surface.

10. The multifunction apparatus as set forth in claim 1 further comprising:
a guide portion that guides a recording medium, wherein the guide portion is positioned adjacent to a front side of the image recording unit in a horizontal direction.

11. The multifunction apparatus as set forth in claim 10;
wherein the guide portion is configured to guide the recording medium along a guide surface of the guide portion toward a top surface side of the image reading unit.

12. The multifunction apparatus as set forth in claim 10;
wherein the guide member is configured to guide the recording medium along a guide surface of the guide portion under the image reading unit.

13. The multifunction apparatus as set forth in claim 10;
wherein a shape of the guide portion can be changed into a plurality of shapes including at least first and second shapes.

14. The multifunction apparatus as set forth in claim 13;
wherein the first shape of the guide portion is configured to guide the recording medium along a guide surface of the guide portion toward the top surface side of the image reading unit.

15. The multifunction apparatus as set forth in claim 14;
wherein the second shape of the guide portion is configured to guide the recording medium along the guide surface under the image reading unit.

16. The multifunction apparatus as set forth in claim 1;
wherein, when the image reading unit is in the second position, the multifunction apparatus includes:
a first protruding portion that protrudes outwardly in one direction from an overlapping area of the image reading unit and the image recording unit, the first protruding portion extending from the image recording unit; and
a second protruding portion that protrudes outwardly in a direction opposite to the one direction from the overlapping area of the image reading unit and the image recording unit, the second protruding portion extending from the image reading unit.

* * * * *